United States Patent [19]

Rudolph et al.

[11] Patent Number: 4,817,382
[45] Date of Patent: Apr. 4, 1989

[54] TURBOPROP PROPULSION APPARATUS

[75] Inventors: Peter K. C. Rudolph, Seattle; Grazyna B. Ostrom, Auburn, both of Wash.

[73] Assignee: The Boeing Company, Seattle, Wash.

[21] Appl. No.: 815,447

[22] Filed: Dec. 31, 1985

[51] Int. Cl.[4] .................................. F02K 3/072
[52] U.S. Cl. .................................. 60/268; 60/39.162; 416/129; 416/171; 74/786
[58] Field of Search ............... 60/226.1, 39.162, 268, 60/39.31, 39.161; 416/171, 170 R, 129, 128; 74/786, 785

[56] References Cited

U.S. PATENT DOCUMENTS

| 1,434,620 | 11/1922 | McCain | 416/129 |
| 2,478,206 | 8/1949 | Redding | 60/268 |
| 2,504,414 | 4/1950 | Hawthorne | 60/268 |
| 2,505,660 | 4/1950 | Baumann | 60/268 |
| 2,526,409 | 10/1950 | Price | 60/268 |
| 2,526,941 | 10/1950 | Fishbein | 416/171 |
| 2,541,098 | 2/1951 | Redding | 60/268 |
| 2,613,749 | 10/1952 | Price | 416/129 |
| 2,663,517 | 12/1958 | Price | 60/268 |
| 2,702,985 | 3/1955 | Howell | 60/268 |
| 3,153,907 | 10/1964 | Griffith | 416/129 |
| 3,363,419 | 1/1968 | Wilde | 60/39.162 |
| 3,646,834 | 3/1972 | Davis | 416/129 |
| 4,540,369 | 9/1985 | Caires | 416/129 |

FOREIGN PATENT DOCUMENTS

| 934469 | 5/1948 | France . | |
| 967567 | 11/1950 | France | 416/128 |
| 586557 | of 1947 | United Kingdom | 60/268 |

OTHER PUBLICATIONS

Shen, "Power Flow in a Differential", *Machine Design,* Apr. 1976, pp. 77-79.

*Primary Examiner*—Donald E. Stout
*Attorney, Agent, or Firm*—Hughes, Cassidy & Multer

[57] ABSTRACT

A turboprop propulsion system where there is a core engine driving a power turbine that is connected through a planetary drive transmission to first and second counterrotating propellers. One of the propellers is connected to the ring gear, while the other propeller is connected to the planetary carrier, the sun gear being driven from the power turbine. The apparatus is provided with a substantially continuous gaseous flow path from the inlet to the exhaust nozzle of the engine, with the planetary drive transmission being spaced radially from the flow path. In some embodiments, the planetary transmission is positioned radially inwardly of the flow path, while in other embodiments, it is positioned radially outwardly of the flow path. The propellers can be in either the pusher configuration or the tractor configuration.

31 Claims, 12 Drawing Sheets

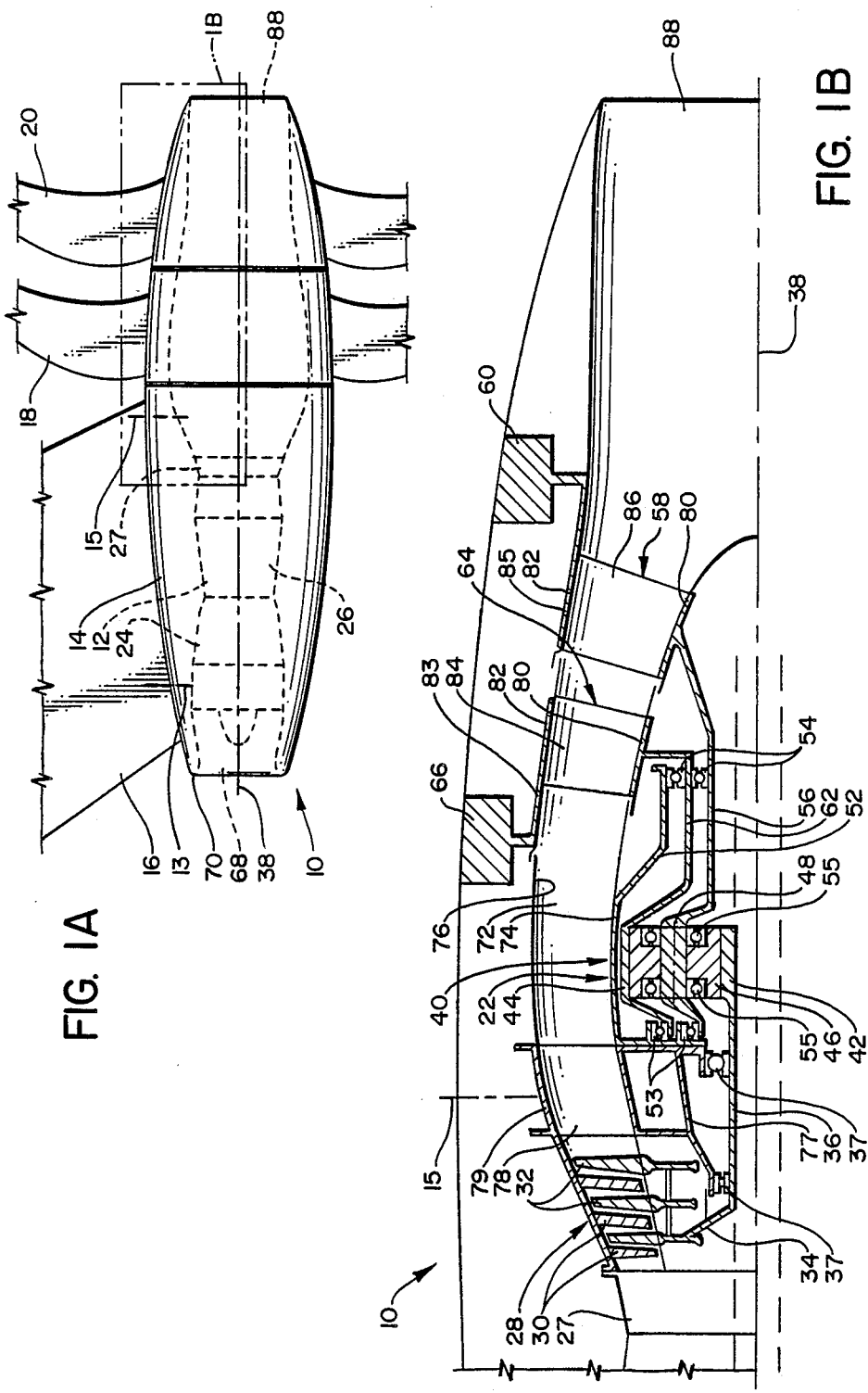

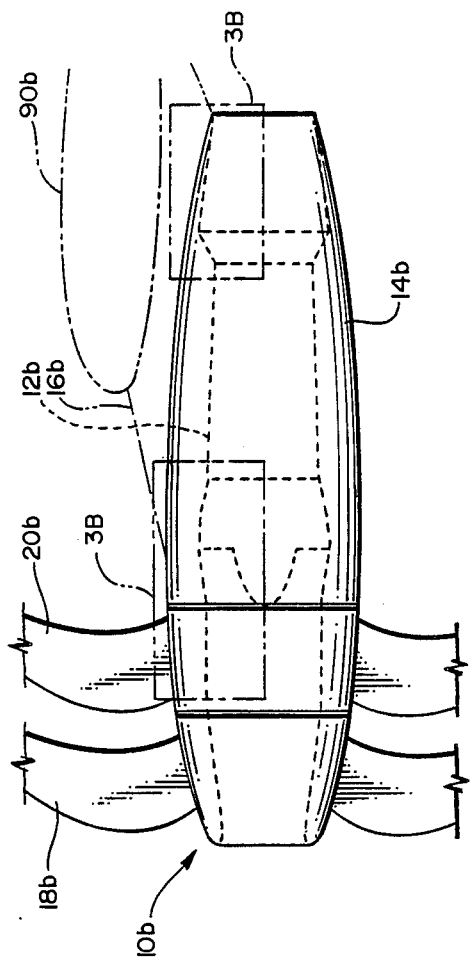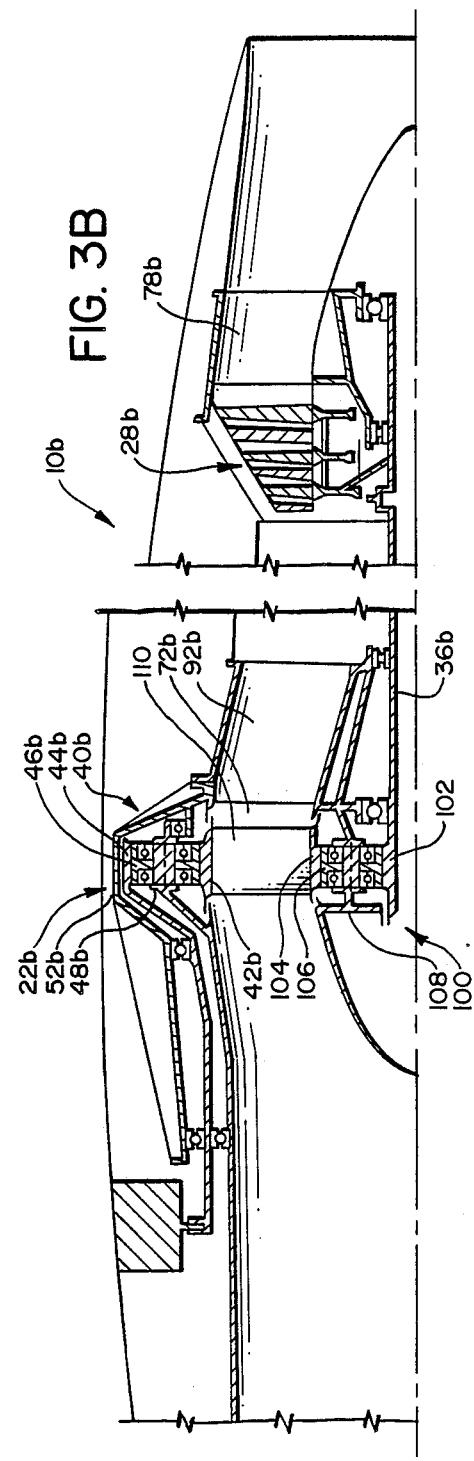

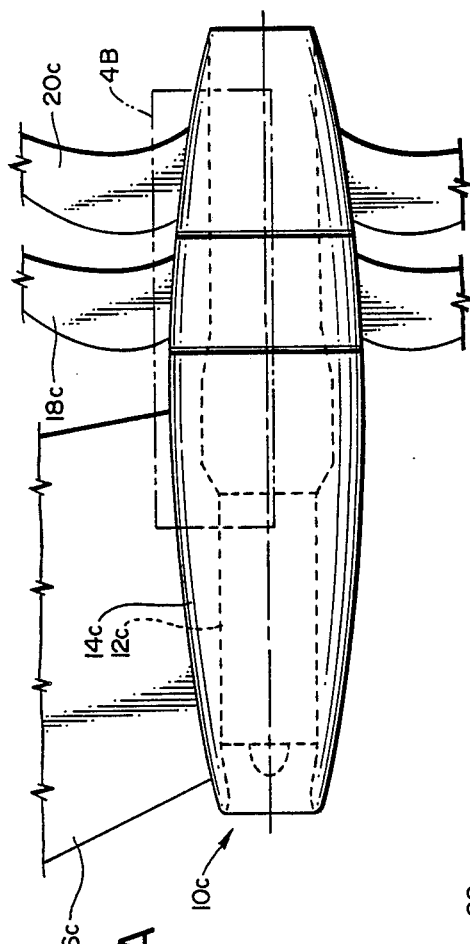
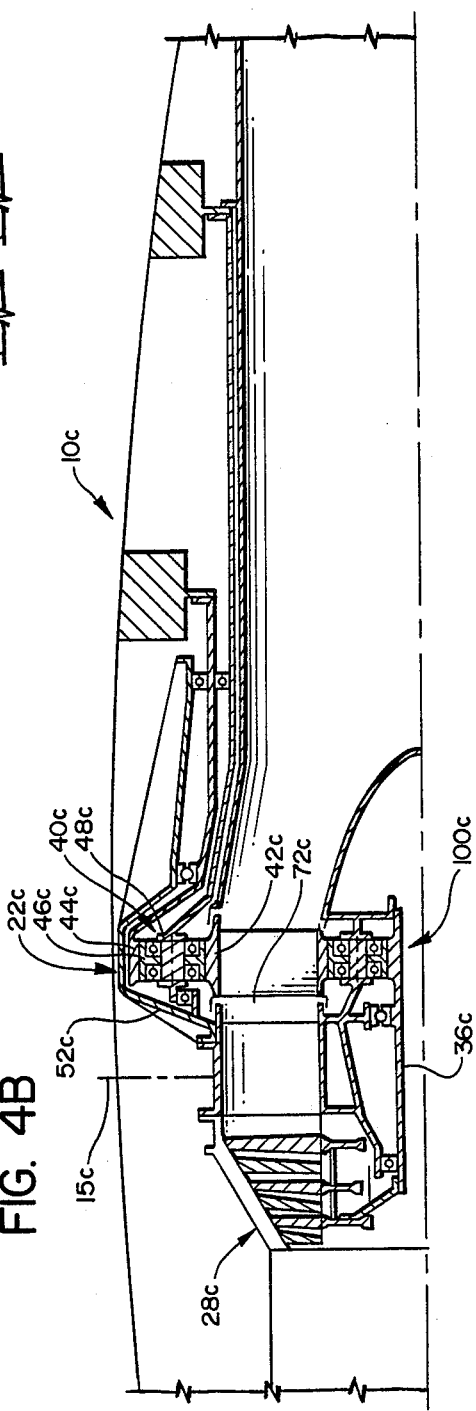
FIG. 4A
FIG. 4B

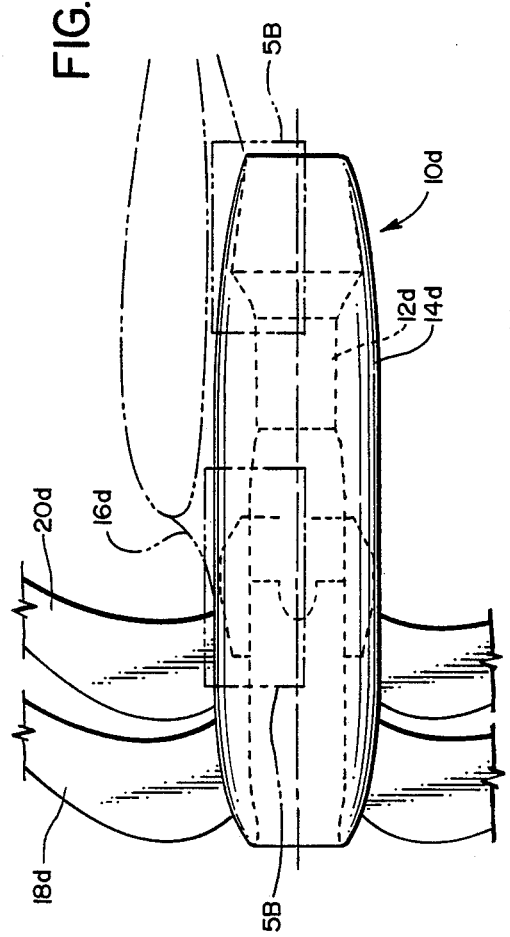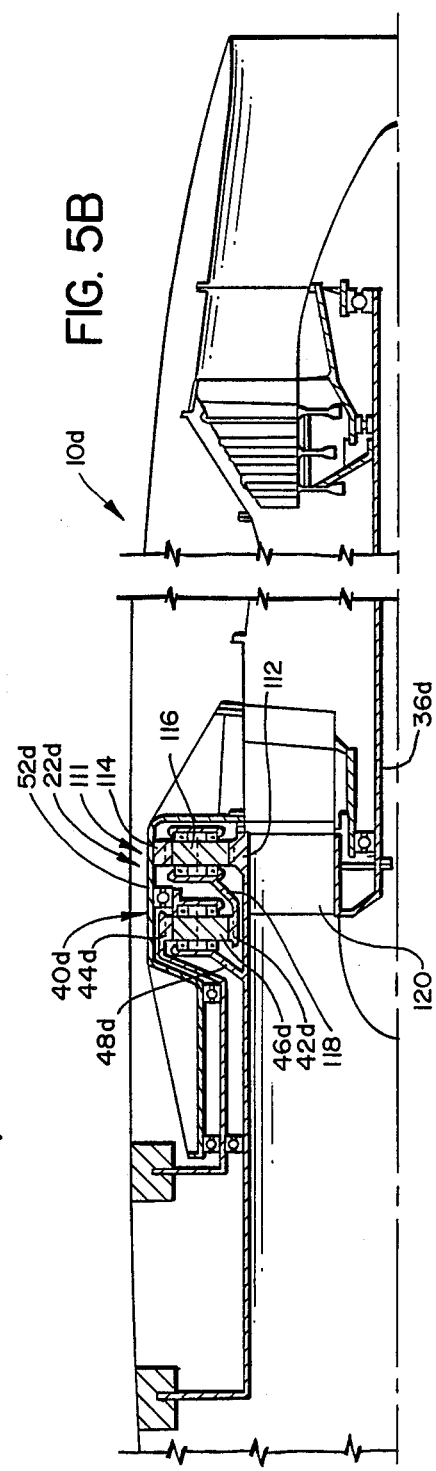

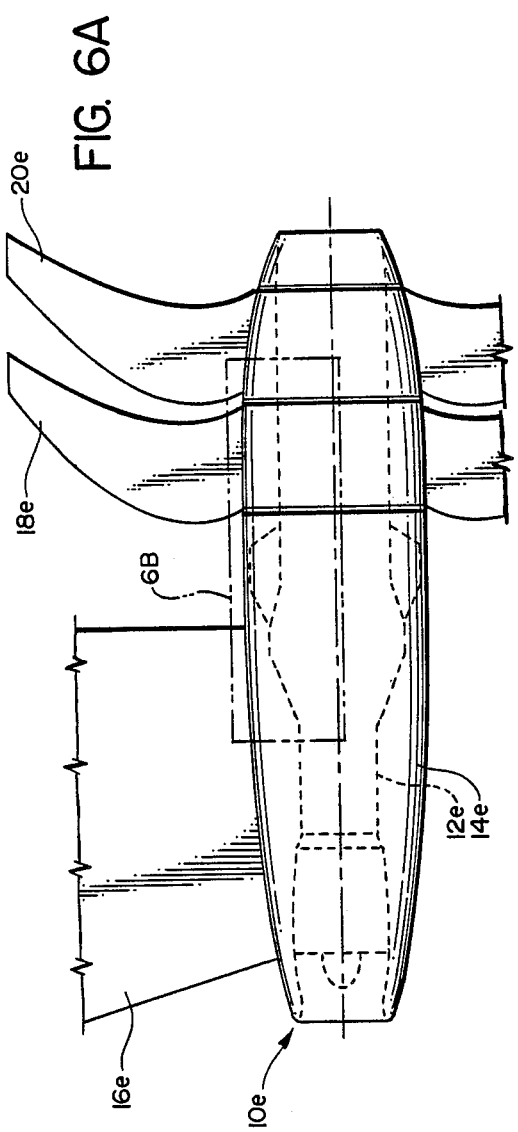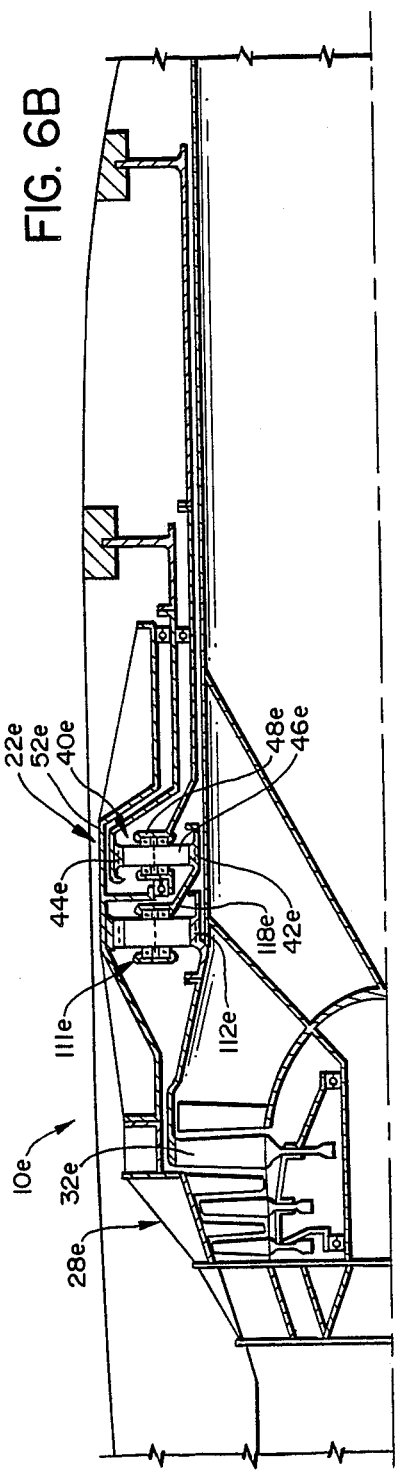

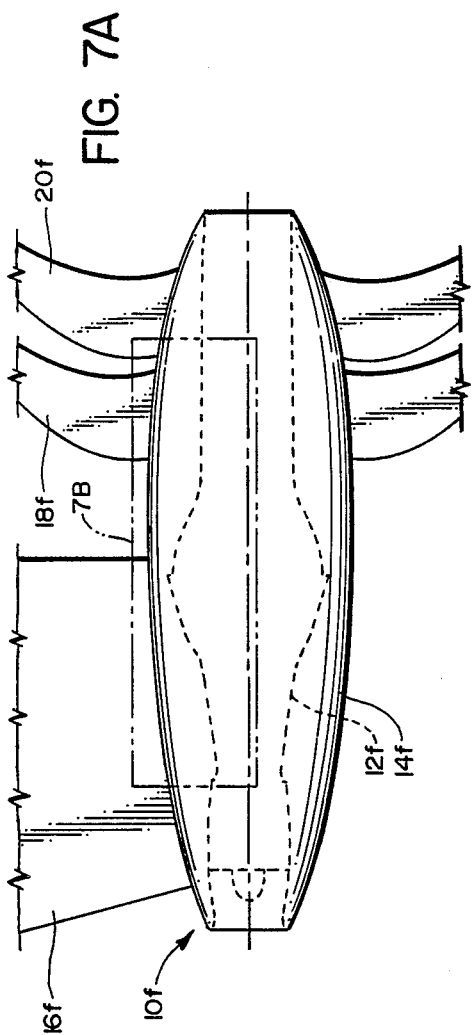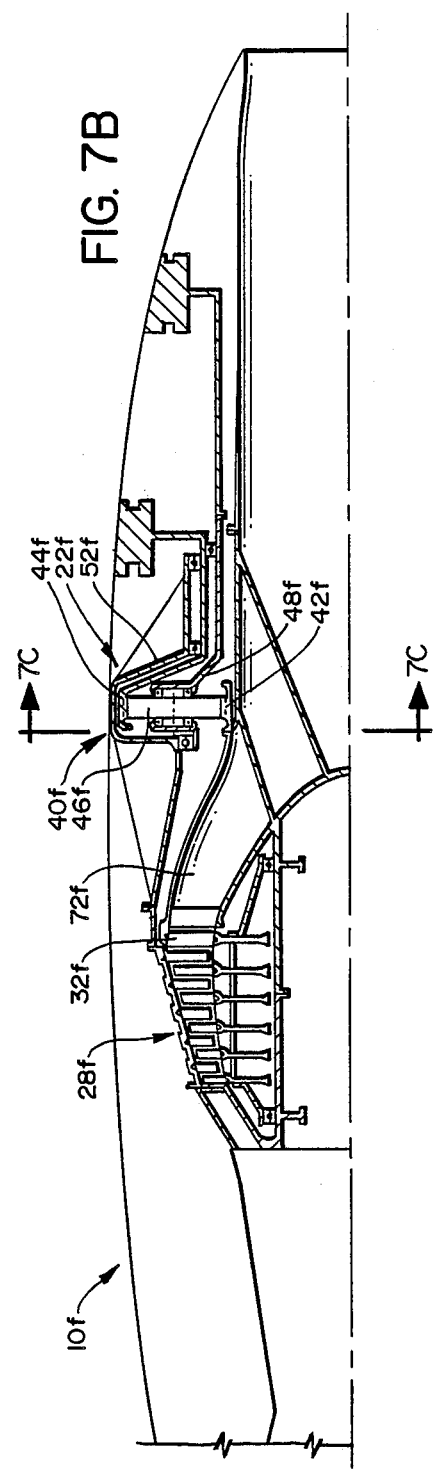

TURBOPROP PROPULSION APPARATUS

BACKGROUND OF THE INVENTION

1. Field of the Invention

The present invention relates to a turboprop propulsion apparatus for an aircraft.

2. Background Art

Turboprop engines are commonly designed to drive either a single row of propellers or two rows of counter rotating propellers, and the propeller(s) can be mounted forward of the engine (called the "tractor" installation) or rearwardly of the engine (called the "pusher" installation). The advantage of the pusher system over the tractor arrangement is that in the pusher arrangement, the engine has an efficient free stream inlet, and the high speed propeller jet does not impinge on airplane or nacelle surfaces, thus avoiding scrubbing drag. Also, a pusher engine installation on the aft body of an airplane avoids the cabin noise problems that wing mounted tractor nacelle engines may cause. However, there is a major drawback of the pusher arrangement in that it is difficult to find a convenient location for the gas turbine exhaust.

There are a number of possibilities to alleviate the problem of the gas turbine exhaust in the pusher arrangement. What would appear to be a relatively simple solution would be to build an exhaust upstream of the propellers. This exhaust could be annular or lobed. However, for either case, the nacelle skin downstream of the exhaust and the lower part of the propeller blades would have to be designed for elevated temperatures caused by the hot exhaust gases. Also, these components may also have to be built from fireproof materials to withstand a brief fire during a wet start.

Another possibility for the primary exhaust is to duct the flow through a mount strut and discharge it at another location (e.g. through the fuselage of the airplane at an aft location). However, this solution involves the weight and cost of a long steel duct, possibly insulated, and the performance loss associated with the pressure drop in a long, elliptical duct. Further, the engine nacelle would have a relatively long configuration, since the elements would normally be arranged in series (these elements being the inlet, gas generator, power turbine, exhaust collector, gear box, and propeller(s)).

A third possibility for a turboprop engine for counter-rotating pusher propellers is to use two counter-rotating, direct drive free turbines, with the propellers mounted over the turbine drums and a plug-type primary exhaust nozzle at the aft end of the nacelle. This makes a rather compact (although rather thick) nacelle, and the primary exhaust is properly located. However, there are several drawbacks. First, there is the complexity of the two multi-stage, counter-rotating free turbines. Also, there is low turbine efficiency resulting from the low turbine blade rotational speeds and the high number of stages needed to extract the required power. Then the propeller efficiency is compromised because of the high disc loading and propeller tip speed. Further, there is the potential noise problem resulting from the high propeller disc loading and tip speed.

Contrary to the pusher engine installation, tractor turboprop engine installations have no exhaust problem, but inlet problems. This is particularly true for the in-line arrangement commonly used for high performance airplanes. In the in-line arrangement, the engine, the gear box and the propellers are all arranged along a common centerline. The power turbine at the rear end of the engine drives a power shaft through the center of the engine. The reduction gearing and the propellers are forward of the gas generator. In order to provide an air inlet for the gas generator, the reduction gearbox has to be located well forward of the engine face. This makes for a large overhang of the gearbox and propellers with the associated structural weight penalties. The engine inlet in this form of a tractor arrangement is either an S-shaped scoop inlet or a curved annular inlet. Both of these inlet types have high inlet pressure losses and cause high inlet pressure distortions.

In general, both the pusher and tractor configurations of a turboprop engine have problems relative to the total gaseous flow into, through and from the engine.

A search of the patent literature has disclosed a number of patents relating to turboprop engines or the like. These are as follows.

U.S. Pat. No. 2,478,206—Redding shows a turboprop engine where there are two counter-rotating propeller rows mounted directly to counter-rotating turbine blades.

U.S. Pat. No. 2,504,414—Hawthorne shows a turboprop engine where there are two counter-rotating blade rows driven from two separate turbine sections. In another embodiment, the counter-rotating blade rows are driven from counter rotating turbine members in the same turbine section.

U.S. Pat. No. 2,505,660—Baumann discloses a turbine engine where air propelling blades are driven directly from rotating turbine portions.

U.S. Pat. No. 2,526,409—Price discloses in FIGS. 2 and 8 a gear drive system for driving counter-rotating propellers. There is a stationary spider on which a plurality of planet gears are mounted, with the turbine driving the planet gears about stationary axes of rotation. The planet gears engage an outer ring gear which rotates one set of blades in one direction, and the planet gears also rotate an inner gear which is connected to the second counter-rotating propeller. In FIG. 3 of that patent, there is a plurality of sets of radial flow turbine blades attached to prospective propeller blades.

U.S. Pat. No. 2,526,941—Fishbein shows a gas turbine system for an aircraft where counter-rotating propellers are driven from a gear box.

U.S. Pat. No. 2,541,098—Redding shows a gas turbine where the propeller is driven from the turbine section.

U.S. Pat. No. 2,663,517—Price shows a particular type of mounting structure for a turboprop engine.

In U.S. Pat. No. 1,663,749—Price, there is shown a gas turbine engine having counter-rotating propellers. There is a gear drive positioned between high and low pressure compressor sections. This gear drive, in addition to drivingly innerconnecting the two compressor sections, also has radially extending shafts which rotate outer pinion gears which in turn rotate a set of axially extending shafts 46. These shafts 46 act through gears at the ends of the shaft, one set of gears being connected to an outwardly positioned ring gear, and another set of gears being connected to an inwardly positioned ring gear. These two ring gears are each in turn attached to a respective set of propeller blades to cause the counter-rotation of the two sets of blades.

U.S. Pat. No. 2,702,985—Howell shows a turbine engine where the compressor section has two sets of compressor blades, both of which are rotatably mounted. One set of compressor blades is connected to a power turbine, while the second set of compressor blades is connected to a propeller. It would appear that in the embodiment of FIG. 1, the propeller is driven by the airflow produced by the blades powered directly from the turbine section, although the patent does not describe this in any great detail. In other embodiments, the propellers or blades are driven directly from the turbine.

U.S. Pat. No. 3,153,907—Griffith shows a power plant where different sets of propeller blades are driven from two separate engines.

French Pat. No. 934,469 (a translation of which is not presently available) shows a variety of duel propeller and single propeller arrangements in a turboprop engine.

By way of further background information, it is believed that a Russian turboprop aircraft, called the "Bear" has used a planetary gear system in connection with a turboprop engine having counter-rotating propellers. However, it is not known whether this is prior art with regard to the present invention, and the details of the construction of such an engine are not known to the applicant. However, this is mentioned to insure that the applicants are complying with their duty to disclose all potentially relevant prior art.

SUMMARY OF THE INVENTION

The turboprop propulsion assembly of the present invention comprises a nacelle having a nacelle support structure. There is a gas generating and power section mounted in the support structure, and this has a longitudinally extending operating axis.

This gas generating and power section comprises:
1. A compressor means to receive the intake air;
2. A burner means to receive air from the compressor and burn fuel therein to create a gaseous combustion product;
3. A turbine means having a turbine blade means centered on, and rotatable about, the operating axis.

The nacelle has a forward inlet and a rear exhaust nozzle, with the propulsion assembly defining a substantially continuous gaseous fluid flow path from the inlet through the gas generating and power section to the exhaust nozzle.

There are first and second propellers mounted for counter rotation at a mounting location radially outward of the flow path.

There is a planetary drive transmission. This transmission comprises an inner sun gear means of a relatively smaller diameter, mounted for rotation about the operating axis and operatively connected to the turbine means so as to driven thereby.

The transmission further comprises ring gear means of a relatively larger diameter, mounted for rotation relative to the support structure about the operating axis and drivingly connected to the first propeller for rotation in the first direction.

Then there is planetary means comprising planetary gear means rotatable about axis means generally parallel to the operating axis and drivingly interconnected between the sun gear means and the ring gear means. This is done in a manner that rotation of the sun gear means relative to the planetary means in a first direction causes rotation of the ring gear means relative to the planetary gear means in a second direction opposite to the first direction. The planetary gear means further comprises planet carrier means operatively connected to the planetary gear means and rotatable about the operating axis. The planet carrier means is drivingly connected to the second propeller for rotation in a direction opposite to the direction of the rotation of first propeller.

The planetary transmission is positioned at a location spaced radially from the flow path in a manner that gaseous fluid flow through the flow path is optimized. Thus, as the turbine section rotatably drives the sun gear, the sun gear causes relative counter rotation of the planet carrier and said ring gear to cause counter rotation of the propellers.

In one configuration, the planetary drive transmission is positioned radially inwardly of the flow path, and there is connecting means extending from the ring gear means and the planetary means through the flow path to connect to the first and second propellers. In one version, the flow path has a flow section positioned rearwardly of the turbine means, with the connecting means extending through the flow section. In this instance, the connecting means comprises strut means contoured to react to gaseous flow from the turbine means to create a power input to the propellers. Also, in this instance, the propellers are mounted to a rear portion of the nacelle support structure in a pusher configuration.

In another arrangement, the flow path has a flow section positioned forwardly of the compressor means, and there is connecting means extending between the ring gear means and the planetary carrier means through the flow section to connect to said first and second propellers. Specifically, the connecting means comprises strut means contoured to react to gaseous flow into the compressor means to create a supercharging effect to the compressor means. In this arrangement, the propellers are mounted to a forward portion of the support structure in a tractor configuration.

In accordance with further embodiments, the planetary drive transmission is located radially outwardly of the flow path, and there is connecting means extending through the flow path and operatively connecting the turbine means to the sun gear means. In one version, the path section and the connecting means are positioned forwardly of the compressor means. In another version, the connecting means and the path section are located rearwardly of the turbine means. In these arrangement, the propellers are arranged in tractor and pusher configuration, respectively.

In the embodiments described immediately above, there is a planetary drive assembly, in addition to the planetary drive transmission described above, mounted radially inwardly of the flow path. This planetary assembly is drivingly connected between the turbine means and through the connecting means to the sun gear of the planetary drive transmission in a manner to cause speed reduction of the sun gear means relative to the turbine means. In a specific configuration, this planetary assembly comprises a second sun gear means operatively connected to the turbine, a second ring gear means connected through said connecting means to the sun gear means of the planetary transmission, and second planetary means having a planetary carrier mounted so as to be stationary relative to the nacelle support structure.

In yet other embodiments, this planetary assembly is positioned radially outwardly of the flow path. In these various embodiments, the drive system is mounted either forwardly of the compressor means or alternatively rearwardly of the turbine means.

The turbine means of the present invention can be arranged so that there is a separate power turbine (i.e. a "free" turbine) that drives the propellers, and a separate compressor turbine means which powers the compressor means. Further, the power turbine can be functionally combined with the compressor turbine so as to have a "shared load turbine", where at least one turbine stage not only drive the propellers, but also supplies power to the compressor means.

Also, in the preferred embodiments, there is a primary mount by which the gas generating and power system, the propellers and the drive transmission are mounted to the nacelle support structure. In one arrangement, the primary mount is positioned immediately rearwardly of said turbine means and forwardly of the planetary drive transmission, with loads from the planetary drive transmission being transmitted to said primary mount. In the preferred configuration, this arrangement is used in combination with a drive transmission which is positioned radially inwardly of the flow path, so that the location of the propellers can be optimized relative to the drive transmission.

In yet another arrangement, the primary mount is positioned immediately forwardly of the compressor means, with the drive transmission being positioned forwardly of the primary mount. Also in this arrangement, desirably the drive transmission is located radially inwardly of the flow path.

Other features of the present invention will become apparent from the following Detailed Description.

BRIEF DESCRIPTION OF THE DRAWINGS

FIG. 1A is a rather schematic side elevational view of a first embodiment of the present invention;

FIG. 1B is a sectional view of the first embodiment of FIG. 1A, with the section being taken along the longitudinal center line of the engine of the first embodiment, and showing only that portion of FIG. 1A which is outlined in broken lines and indicated at 1B;

FIGS. 2A-7A and also FIGS. 2B-7B are views similar to FIGS. 1A and 1B, respectively, with each pair of FIGS. 2A-2B through 7A-7B showing a further one of six additional embodiments of the present invention, with FIGS. 2A and 2B showing the second embodiment, FIGS. 3A and 3B showing a third embodiment, and with this pattern continuing so that FIGS. 7A and 7B show the seventh and final embodiment;

DESCRIPTION OF THE PREFERRED EMBODIMENTS

Figure 1C:
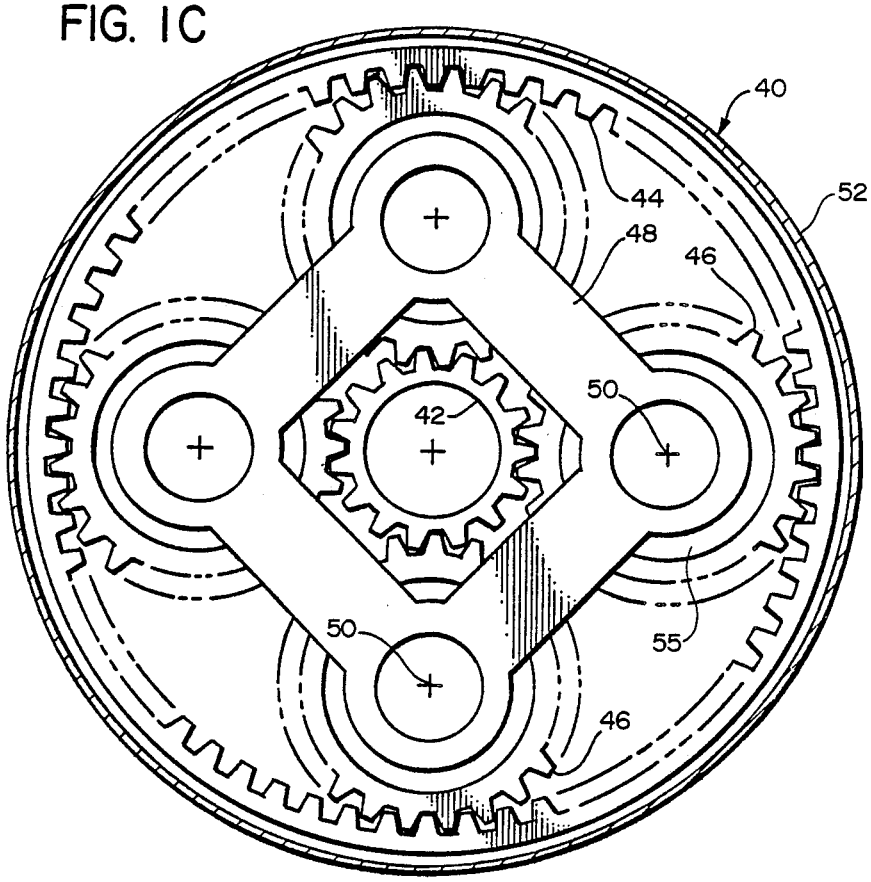
FIG. 1C is a sectional view taken along lines 1C—1C of FIG. 1B.

With reference to FIGS. 1A, 1B and 1C, there is shown a first embodiment, generally designated 10, of the turboprop engine assembly of the present invention. This assembly 10 comprises a core engine 12 mounted in a nacelle structure 14 which is in turn mounted by means of a mount strut 16 to the aft fuselage of an aircraft.

For convenience of illustration, neither the fuselage nor the rest of the aircraft are shown. There are two counter-rotating rows of propellers, namely a forward propeller row 18 and a rear propeller row 20, mounted to the rear portion of the nacelle at a location rearwardly of the core engine 12 and the strut 16 (this being a "pusher" configuration, as opposed to a "tractor" configuration where the propellers are mounted at a more forward location).

Interconnecting the turboshaft engine 12 with the two propellers 18-20 is a planetary drive transmission 22. The arrangement of this transmission 22 relative to the structure and operating components of the present invention, is considered to be especially significant in the present invention and will be discussed in more detail later herein.

The core engine or gas generator 12 is (or may be) in and of itself conventional and this engine 12 comprises forward compressor section 24, an intermediate burner section 26 and a rear compressor turbine section 27. The engine 12 can be either a single spool or a multiple spool engine, with the compressor section being driven by a single turbine (single spool—see FIG. 9B), or the compressor having two sections driven by two turbines (two spool—see FIG. 9A).

The burner section 26 performs its usual function of receiving the compressed intake air from the compressor 24 and burning fuel therein to create a gaseous combustion product. The gaseous combustion product is in turn directed through the compressor turbine 27 to drive the same. Downstream of the compressor turbine 27 is the power turbine 28. This turbine 28 is, as shown herein, a free turbine with three stages, having three sets of stationary guide vanes 30 and three sets of turbine blades 32. This is a disc-type turbine, and the three sets of blades 32 are connected to a drive member 34 that is in turn fixedly connected to a longitudinally extended drive shaft 36. (The shaft 36 is centered on the longitudinal center line 38 of the engine, this centerline 36 being considered as the operating axis of the engine 12.)

Figure 9A:
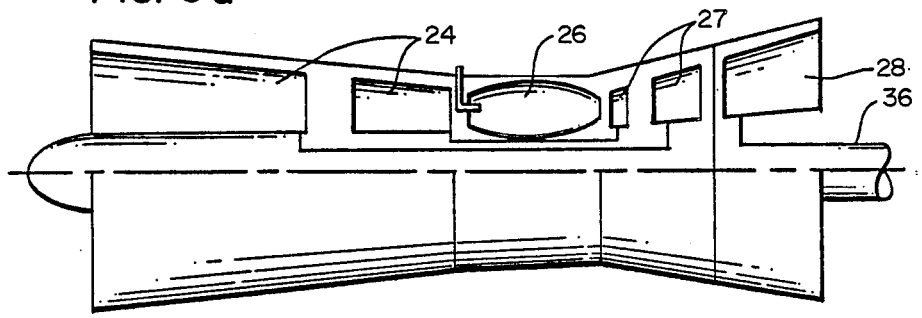
FIGS. 9, 9A and 9B are three schematic drawings of different versions of the gas generating and power section of the first embodiment shown in FIGS. 1A-1C, with FIG. 9A showing a two spool turboshaft engine with a free power turbine, FIG. 9B showing a single spool turboshaft engine with a free power turbine, and FIG. 9C showing a two spool turboshaft engine with a "shared load" turbine.
Figure 9B:
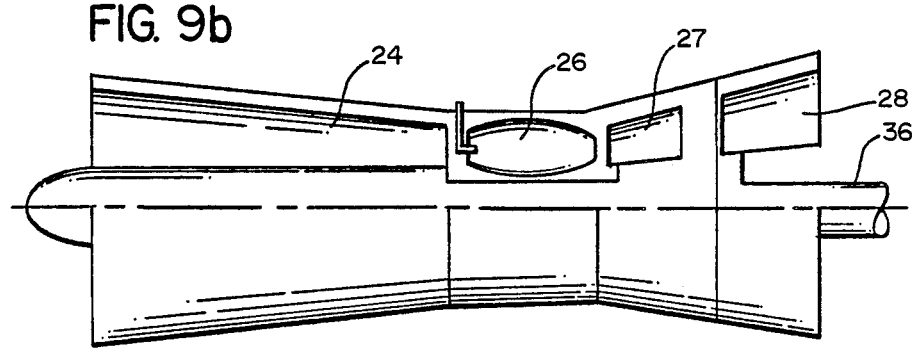
Figure 9C:
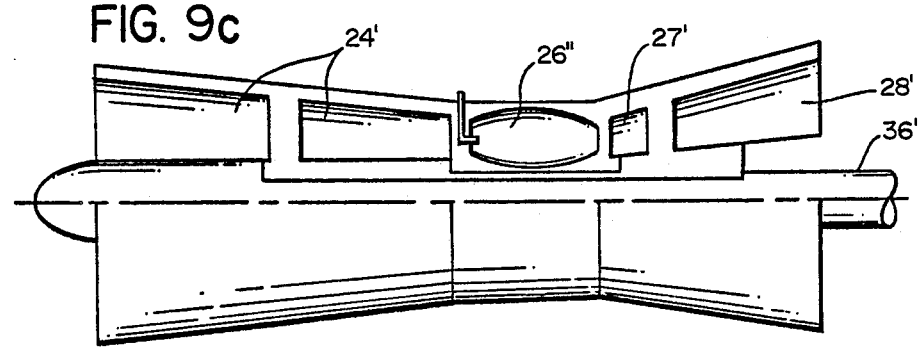

FIGS. 1A and 1B show the power turbine 28 as a free turbine, the sole purpose of which is to drive the propellers through the drive transmission 22. As indicated above, the core engine 12 can be a two spool engine, as illustrated in FIG. 9A, or a single spool engine, illustrated in FIG. 9B, with the power turbine 28 being a free turbine for both of the engines shown in FIGS. 9A and 9B. There is, however, another commonly used arrangement, where the power turbine 28 is a "shared load" turbine, as illustrated in FIG. 9C. In FIG. 9C, the numerical designations of the components are given a prime (') designation to distinguish these from the components in FIGS. 9A and 9B. In the configuration of FIG. 9C, the rear low pressure turbine 28' has more stages, turns somewhat slower and powers not only the propellers, but has a drive shaft 36' that extends forwardly through the center of the engine and drives the low pressure compressor section 24'. There is also a high pressure compressor section 24" which is driven directly from the compressor turbine 27'.

Whether the power turbine is a "free turbine" or "shared load turbine" has little effect on the basic concepts of the present invention, except that the differences in turbine rotational speed requires somewhat different reduction ratios for the gear transmission 22. In describing the first embodiment and the other embodiments herein, it will be assumed that the power turbine 28 is a "free turbine", with the understanding that the shared load turbine configuration could also be used. Further, the core engine 12 and the free turbine 28 will be considered collectively as a gas generating and power section, which could be in any one of the forms shown in FIGS. 9A, 9B, and 9C.

To describe the transmission 22 more particularly, there is a single stage planetary gear assembly 40, comprising an inner sun gear 42, an outer ring gear 44, and a plurality of planet gears 46 which have a tooth engagement with both the sun gear 42 and ring gear 44. The planet gears 46 are mounted to a spider structure or planet carrier 48 in a manner that the planet gears 46 are maintained in proper spaced relationship relative to the other so that each of the planet gears 46 rotates about its respective center axis 50.

This gear assembly 40 is mounted in a gear box 52 that is in turn connected to stationary structures that is part of the engine rear mount frame or exhaust casing. Suitable bearing members and seals are provided at appropriate locations. The bearings for the free turbine shaft and the sun gear are designated 37. The forward bearings for the two propeller shafts are designated 53 and the rear bearings 54. The bearings for the planet gears are designated 55.

The sun gear 42 is fixedly connected to the rear end of the aforementioned drive shaft 36, and is thus rotatable with it. The planet carrier 48 is connected to a rearwardly extending planet carrier drive shaft 56 that extends through the rear end of the gear box 52 to attach to a rotatable torque frame 58 that in turn connects to a mounting ring 60 that supports the aft propeller blades 20. The ring gear 44 is fixedly connected to a rearwardly extending drive shaft 62 that also extends through the rear of the gear box 52 to connect to a second forward torque frame 64 that in turn connects to a forward mounting ring 66 to which the forward propeller blades 18 are mounted.

With the main operating components of the assembly 10 of the first embodiment having now been described, attention is now turned to the arrangement of the assembly 10 relative to the pattern of gaseous flow therethrough. The initial flow into the engine is the airflow into the inlet 68 at the forward end of the nacelle structure 14. This inlet 68 is defined by the forward annular lip 70 of the nacelle structure 14, and it will be noted that the inlet 68 is substantially unobstructed and is located at the center operating axis 38. (More specifically, the inlet 68 is centered on the operating axis 38.) Further, it will be noted that the inlet 68 is located so that it is not affected by the wash created by the propellers 18 and 20.

The gaseous flow through the core engine 12 is, as indicated previously, conventional. Thus, the air passing into the inlet 68 is compressed in the compressor section 24 and passed into the burner section 26. The air and combustion products from the burner section 26 then pass through the compressor turbine(s) 27 and the power turbine 28 and into an annular passageway 72.

This annular passageway 72 is defined by inner and outer generally concentric walls 74 and 76, respectively. At the forward part of the passageway 72, there is a plurality of mounting struts 78 inside the turbine exhaust case 79 contoured so as to minimize any adverse affect on the gaseous flow from the turbine 28. The passageway 72 extends around the gear box 52 and the gear assembly 40 and then to the location of the two torque frames 64 and 58. The torque frames 64 and 58 are each provided with inner and outer annular wall sections 80 and 82, respectively, that define that portion of the passageway 72 at the location of the two torque frames 64 and 58. Those portions of the two torque frames 64 and 58 that are positioned in the passageway 72 are provided as struts 84 and 86, respectively, that are contoured as turbine blades, so that the gaseous flow in the passageway 72 causes these struts 84 and 86 to function as power turbine blades to aid in driving the propellers 18 and 20.

Rearwardly of the rear set of struts 86, the passageway 72 terminates into a rear exhaust nozzle 88. As shown herein, this nozzle 88 is or may be of conventional design. As shown, the exhaust nozzle is rotating with the aft propeller row.

To describe the operation of the present invention, the air enters through the inlet 68 and passes through the core engine 12 in the manner described above, with the gaseous exhaust from the burner section 26 driving the compressor turbines 27, which power the compressor(s) 24 and also supply power to the free turbine 28, which, through the transmission 22, drives the propellers 18 and 20. The gaseous flow from the turbine section 28 then flows through the annular passageway 72 to exit from the nozzle 88. It can be appreciated that there is a continuous flow and straight passage from the inlet 68, through the engine 12, through the passageway 72 and out the nozzle 88, with the components and the overall structure of this engine assembly being such that this overall flow pattern can be accomplished with relatively high efficiency. Even the flow through the aft portion of the passageway 72 can be utilized to act on the turbine-like struts 84 and 86 to extract yet more power from the turbine exhaust so that this power can be delivered to the propellers 18 and 20.

With regard to load reactions, FIG. 1A shows a front mount 13 on the forward end of the gas generator and FIG. 1B shows a rear mount 15 on the turbine exhaust case 79. The center of gravity for the overall engine and propeller installation is close to this rear mount 15. It is therefore obvious that the rear mount 15 will react the larger part of the mass inertia and all of the thrust loads, while the forward mount 13 will only react the smaller loads created by the overhung weight of the gas generator. With the majority of the loads reacted through the turbine exhaust frame, this frame becomes the structural backbone with a strong outer shell 79 and mount flanges, strong struts 78 and a strong internal structure 77. This structure is ideally suited to react the loads from the power turbine, the gear box and the propellers.

In the state of the art pusher turboprop arrangement, the gearbox is cantilevered aft a long ways to allow space for an exhaust collector and exhaust upstream of the propellers. In this invention, the exhaust flow continues on axially and does not require space between turbine, gearbox and propellers. The gearbox and propellers are therefore located very close to the turbine exhaust frame 79. This makes for a very short load path and overhang distance for the gearbox loads and the propeller loads relative to the main mounting point. This efficient load reaction will make this engine and transmission arrangement very light and short.

To describe the short load path more specifically, the bearing locations in FIG. 1B will be examined in more detail. The loads from the power turbine 28 are reacted in two bearings 37 exactly inside the turbine module, a very short load path. The load path from the sun gear to the power shaft bearings 37 is very short. The planetary reduction gear box 52 is flange mounted to the aft face of the exhaust case 77. The two forward bearings 53 for the propeller drive shafts 50 and 56 are located right next to the rigid aft face of the exhaust case, but inside the case of the reduction gear box. The gear box case 52 is elongated on its aft end to provide structural support for the aft bearings 54 for the propeller drive shafts 50 and 56, while maximizing the distance between front bearings 53 and aft bearings 54. The wide spacing between the front and aft bearings will reduce bearing loads. The forward propellers 18, not being restricted in their axial location by an exhaust system, can be moved forward into a minimum distance position relative to the trailing edge of the mount strut 16. This moves the center line of the forward propellers 18 and their mounting rings 66 forward of the aft propeller shaft bearing 54. This means that the forward propellers 18 are not cantilevered relative to the bearing couple. This in turn helps reduce the cantilever of the aft propellers 20 and their mounting ring 60 relative to the shaft bearing couple 53 and 54.

Also, with the torque frames 84 and 86 being offset relative to the respective propeller mounting rings 66 and 60, there is provided a length of conical drive shaft 83 and 85 between the rigid torque frames 84 and 86, which are in the hot flow and the propeller mounting rings 66 and 60, which are on the outer periphery of the nacelle and are cold. The length of drive shaft can flex and precludes high stresses due to differential thermal expansion between the torque frames and the propeller mounting rings. In summary, the structural arrangement of the turboprop transmission apparatus in FIGS. 1A–1C is extremely short coupled and provides a very efficient load path. This will minimize structural weight and reduce nacelle length for improved aerodynamic performance.

With regard to the transmission 22, an examination of the gear assembly 40 reveals that a quite effective speed reduction is accomplished in driving the propellers 18 and 20 from the shaft 36. As indicated previously, the sun gear 42 constitutes the power input to the gear assembly 40 while the ring gear 44 constitutes the power output to the forward propeller 18 and the planet gears and carrier 46–48 constitute the drive to the aft propeller 20. In a typical configuration of this gear assembly 40, it would be quite practical to accomplish a nine to one speed ratio from the shaft 38 to the propellers 18 and 20. For example, if the turbine speed was 11,000 revolutions per minute (rpm), the rotational speed of each propeller row 18 or 20 could be between 1200 and 1300 rpm, assuming equal and opposite rpm for the two rows of propellers.

Figure 8:
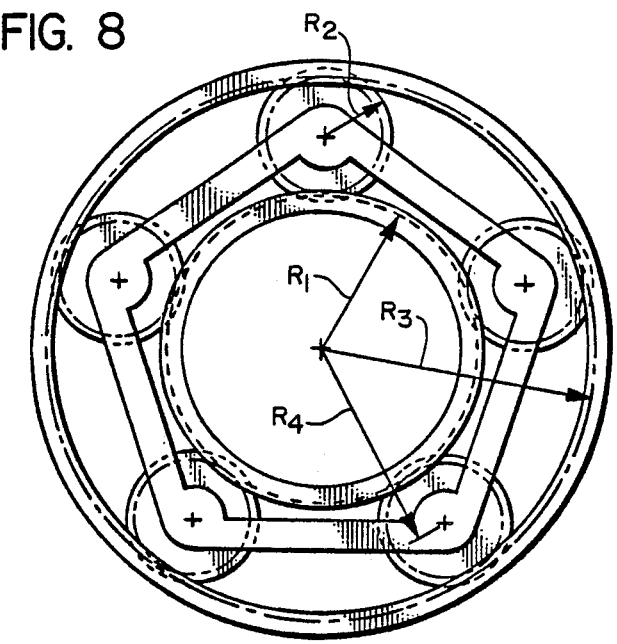
FIG. 8 is a schematic view of a planetary gear system to illustrate the mathematical formulas relevant to relative rates of rotation of the components of the system.

To analyze this further, reference is made to FIG. 8, where a planetary drive is shown somewhat schematically. The radius of the sun gear is indicated at R1; the radius of each planetary gear is indicated at R2; the radius of the ring gear is indicated at R3; and the radial distance from the center of rotation of the sun gear and the ring gear to the several centers of rotation of the planet gears is indicated at R4. We shall consider three cases, namely:

a. where the planetary transmission is used as a counter-rotating differential (as in the present invention), with the sun gear being the input and both the planet carrier and the ring gear counter rotating so that both act as power outputs (as in the present invention), with the output torque controlled by propeller blade pitch so that both output shafts turn at the same, but opposite rmp;

b. where the ring gear is fixed and the sun gear is driven as the power input so that the planet carrier is the output;

c. where the planet carrier is held stationary and the sun gear rotates as the power input so that the ring gear is the output.

In giving the formulas which indicate the relative rates of rotation, the following designations are used, these being:

$N_1$ = the rotational speed of the sun gear;
$N_3$ = the rotational speed of the ring gear;
$N_4$ = the rotational speed of the planet carrier.

In case a. above (where both the planet carrier and the ring gear counter rotate so that there are two outputs), and assuming that $N_3 = -N_4$, the relative rates of rotation are as follows.

$$N_4/N_1 = R_1/(2R_3 + R_1).$$

In case b. where there is a fixed ring gear, and the output is through the planet carrier, the relative rates or rotation are in accordance with the following:

$$N_4/N_1 = R_1/(R_1 + R_3).$$

In case c. where the planet carrier is stationary, the relative rates of rotation are given by the following formula:

$$N_3/N_1 = R_1/R_3.$$

To work this through in terms of numerical values, let it be assumed that the sun gear has a radius of one unit, each of the planet gears has a radius of one unit, and the ring gear has a radius of three units. In the first case, where both the planet carrier and the ring gear are rotating at equal rates of rotation, the speed reduction ratio would be 7:1. In the second situation, where the ring gear is held stationary, the speed reduction ratio is 4:1. In the third instance, where the planet carrier remains stationary, the speed reduction ratio is 3:1.

From the above analysis, it becomes apparent that as the radius of the sun gear is made smaller relatively to the ring gear, the speed reduction ratio can be increased. Since in this first embodiment, the sun gear is located immediately adjacent to the main drive shaft 36, the radius of the sun gear 42 can be made relatively small.

In describing the next six embodiments (i.e. embodiments 2–7), components which are similar to the first embodiment will be given like numerical designations, with letter suffixes distinguishing those of the additional embodiments. Thus, the components of the second embodiment will be distinguished by the suffix "a"; the third embodiment, shown in FIG. 3, will be distinguished by the suffix "b"; . . . and so forth, until the seventh embodiment which will be distinguished by the letter suffix "f".

Figure 2A:
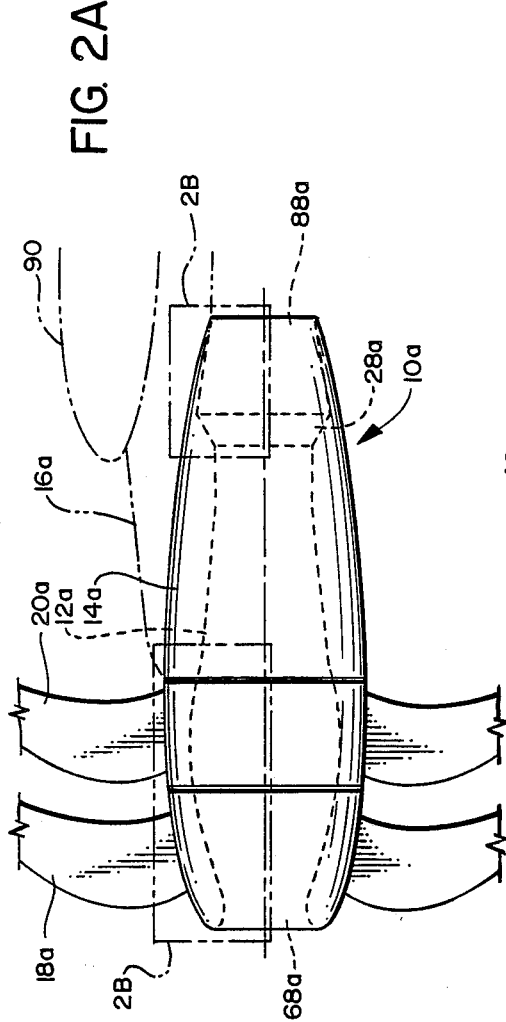
Figure 2B:
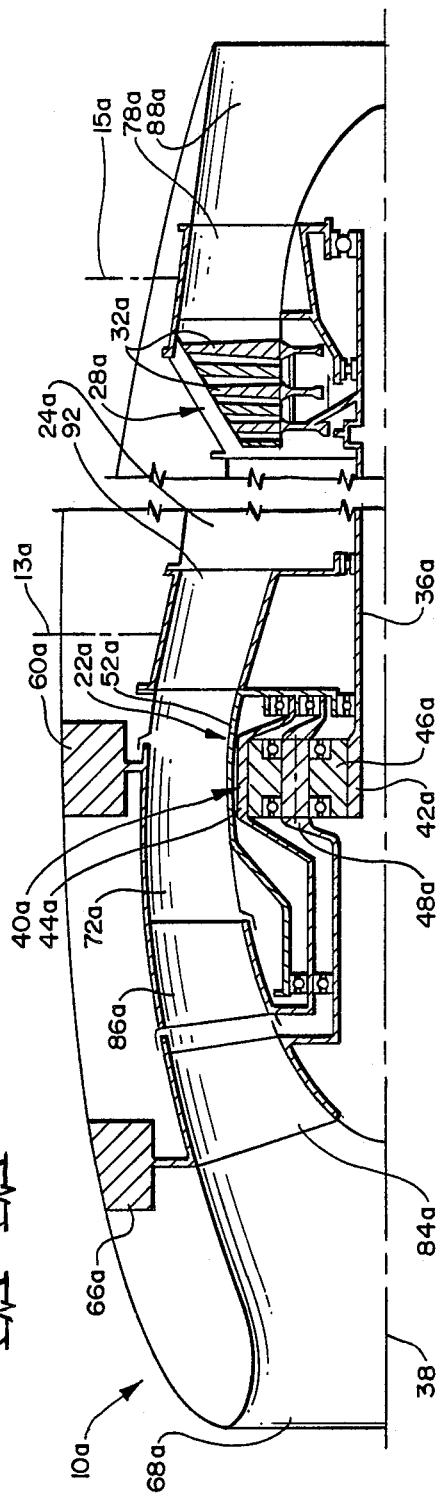

The turboprop engine assembly 10a of the second embodiment is shown in FIGS. 2A–2B, and this differs from the first embodiment of FIGS. 1A–1C in that the overall configuration is that of a tractor arrangement (where the propellers 18a and 20a are mounted at the forward part of the nacelle structure 14a). The general location of the planetary gear assembly 40a relative to the passageway 72a is substantially the same as in the first embodiment, except that in this second embodiment, the passageway 72a is an inlet passage to receive the inflow of air which passes into the inlet 68a, with this air passing through the passageway 72a to in turn pass into the compressor section 24a of the core engine 12a.

As in the first embodiment, the second embodiment has a sun gear 42a mounted directly to the drive shaft 36a. Further, the ring gear 44a, the planet gears 46a and the planet carrier or spider 48a are all located within the gear box 52a. The main strut 16a extends forwardly from the lower forward end of the wing which is shown at 90.

In addition to having the rear mounting struts 78a, there is a second set of forward mounting struts 92.

The drive shaft 36a extends through the middle of the gas generator and is connected by its rear end to the turbine blades 32a and extends forwardly to drive the sun gear 42a. It will be noted that as in the first embodiment, the continuous flow passage from the inlet 68a to the nozzle 88a is in general optimized for proper performance of the assembly 10a. More specifically, the inlet 68a remains substantially unobstructed; the flow through the passageway 72a does not entail any significant losses; and the flow through the core engine 12a to the nozzle 88a can be made conventional so as to optimize performance.

With regard to the drive from the gear assembly 40a to the propellers 18a and 20a, this is accomplished substantially in the same manner as in the first embodiment of FIGS. 1A–1C.

The major differences of the second embodiment in FIGS. 2A–2B over the first embodiment in FIG. 1 are as follows:

The center of gravity has moved close to the forward mount frame 92. Therefore, the forward mount 13a takes the majority of the mount loads. The rear mount 15a reacts only the vertical side loads from aft engine weight.

The torque frames 84a and 86a have changed to compressor stages which help boost engine compression ratio.

The close coupled relationship between gearbox 40a and mount frame 92 is similar to the first embodiment.

The second embodiment has no temperature expansion problem between torque frames 84a and 86a and the propeller mount rings 66a and 60a, because the torque frames operate in cold inlet air.

The propellers 18a and 20 are moved even further over the gear box 40a, further reducing propeller overhang over the bearings.

The inlet inner and outer surfaces are rotating with the forward propellers 18a. There is no performance penalty to this.

The forward propellers 18a are driven by the planet carrier shaft, the aft propellers 20a by the ring gear shaft, just reversed from the pusher.

The second embodiment solves the inlet problem commonly associated with "tractor" turboprop installations.

The second embodiment is shown as a wing mounted nacelle. The wing mount is the main reason to go to a tractor configuration. However, the tractor could also be installed elsewhere, such as on the sides of the aft body.

Figure 3C:
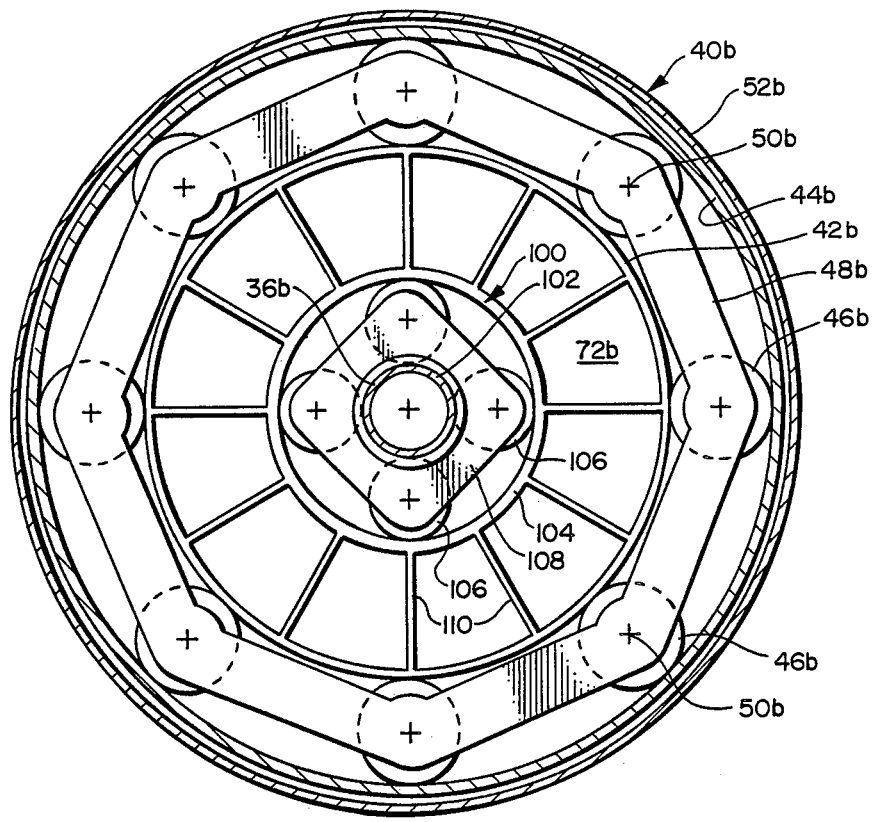
FIG. 3C is a sectional view taken along line 3C—3C of FIG. 3B.

The third embodiment is illustrated in FIGS. 3A–3C, and components which are similar to the first two embodiments will be distinguished for this embodiment by means of a "b" suffix to the numerical designations.

This third embodiment is, like the second embodiment of FIGS. 2A–2B, of a tractor configuration where the propeller blades 18b and 20b are mounted at the forward part of the nacelle structure 14b and forwardly of the wing 90b. The core engine 12b is the same as in the previous two embodiments, and there are forward and rear mounting struts 92b and 78b, respectively.

This third embodiment of FIGS. 3A–3C differs from the first two embodiments primarily with respect to the arrangement of the transmission 22b. In this third embodiment, there is a planetary gear assembly 40b having a ring gear 44b that drives the rear propeller 20b and a planet carrier 48b which drives the forward propeller 18b. However, the components 42b–48b which make up the gear assembly 40b are all positioned outside of the annular passageway 72b.

In this third embodiment of FIGS. 3A–3C, there is a second planetary gear assembly, generally designated 100, positioned concentrically within, and spaced radially inwardly of, the planetary gear assembly 40b. This assembly 100 comprises a sun gear 102 fixedly connected to the shaft 36b, a ring gear 104 mounted for rotation about the center axis of the shaft 36b, and a plurality of planet gears 106 rotatably mounted about their respective center axes to a planet carrier 108 that is in turn fixedly connected to stationary structure. The ring gear 104 of the inner gear assembly is connected to the sun gear 42b of the outer gear assembly by a plurality of struts 110 which comprise a torque frame.

The operation of the third embodiment of FIGS. 3A–3C is generally the same as in the prior two embodiments, in that the flow through the annular passageway 72b is optimized, and the turbine 28b supplies power to the propellers 18b and 20b. With respect to the transmission 22b, rotation of the shaft 36b causes the sun gear 102 to rotate at the same speed as the shaft 36b. (See FIG. 3B.) With the planet carrier 108 being mounted to stationary structure, the ratio of the relative rates of rotation between the sun gear 102 to the ring gear 104 is inversely proportional to the ratio of the radii of the two gears. Thus, there is an initial speed reduction from the rotation of the shaft 36b to the sun gear 42b which has the same rotational speed as the ring gear 104. Then the sun gear 42b acts through the counter-rotating ring gear 44b and planet carrier 48b to cause the counter-rotation of the propellers 18b and 20b in a manner to cause a further reduction in rotational speed.

The fourth embodiment is shown in FIGS. 4A–4B, and the components of this fourth embodiment are distinguished by a "c" suffix. This fourth embodiment is substantially the same as the third embodiment of FIGS. 3A–3C, except that it is arranged in a pusher configuration, where the propellers are mounted rearwardly of the main strut 16c and aft of the core engine 12c. The arrangement of the transmission 22c is substantially the same as in the third embodiment of FIGS. 3A–3C, in that there is a central planetary gear assembly 100c positioned radially inwardly of the passageway 72c, and the outer planetary assembly 40c. Since it is believed that the mode of operation of this fourth embodiment is readily understandable from a review of the operation of the first three embodiments, there will not be a detailed description of this fourth embodiment.

The fifth embodiment is shown in FIGS. 5A-5B, and the components of this fifth embodiment will be distinguished by a "d" suffix. The overall assembly 10d is in the tractor configuration, with the two propeller blades 18d and 20d being positioned forwardly of the main strut 16d. This fifth embodiment differs from the previous embodiments primarily in the configuration of the transmission 22d.

As illustrated in FIGS. 5A-5B, there is a forward planetary gear assembly 40d, and as in the prior embodiment, the ring gear 44d drives one of the propellers (i.e. 20d), while the planetary carrier 48d drives the other propellers 18d.

There is a second planetary assembly 111 which operatively innerconnects the sun gear 42d of the forward gear with the planet carrier of the rear gear 118. This second planetary assembly 111 comprises a sun gear 112 which is driven from the shaft 36d, through a torque frame 120, a ring gear 114 which is connected to stationary structure that is part of the gear box housing, and a set of planet gears 116 connected to a planet carrier 118 that is in turn fixedly connected to the sun gear 42d. The sun gear 112 is fixedly connected to the shaft 36d by a torque frame 120 with a plurality of struts, these struts being positioned in the main passageway 72d.

In this fifth embodiment of FIGS. 5A-5C, both planetary assemblies 40d and 111 are positioned radially outwardly of the main passageway 72d. The sun gear 112 rotates at the same speed as the shaft 36d and accomplishes a speed reduction in driving the second sun gear 42d. This second sun gear 42d functions as in the previous embodiment to act through the ring gear 44d and the planet carrier 48d to drive the two propellers 20d and 18d, respectively.

A sixth embodiment is illustrated in FIGS. 6A-6B, and components of this sixth embodiment will be distinguished by an "e" suffix. The overall assembly 10e is of a pusher-type configuration, with the propeller blades 18e and 20e being located rearwardly of the strut 16e and also rearwardly of the turbine section 28e.

The overall arrangement of the transmission 22e is similar to that of the fifth embodiment of FIGS. 5A-5B, in that there are two planetary gear assemblies 40e and 111e. The planetary assembly 40e has the ring gear 40e attached to the propeller 18e and the planet carrier 48e attached to the rear propeller 20e. Further, the sun gear 42e is attached directly to, and driven by, the planet carrier 118e of the planetary gear assembly 111e. The sun gear 112e is driven directly from the rear turbine blades 32e, which are increased in size to act as a torque frame.

The overall mode of operation of this sixth embodiment is generally the same as in the previous embodiment. A speed reduction is obtained from the turbine 28e by means of the forward planetary gear assembly 111e, and a further reduction is achieved by use of the planetary assembly 40e, in the manner described previously herein. The gaseous flow has the same desirable aspects as described relative to the earlier embodiment, and the exhaust from the turbine section 28e passes through the passageway 72e radially inwardly of the two planetary gear assemblies 40e and 111e.

Figure 7C:
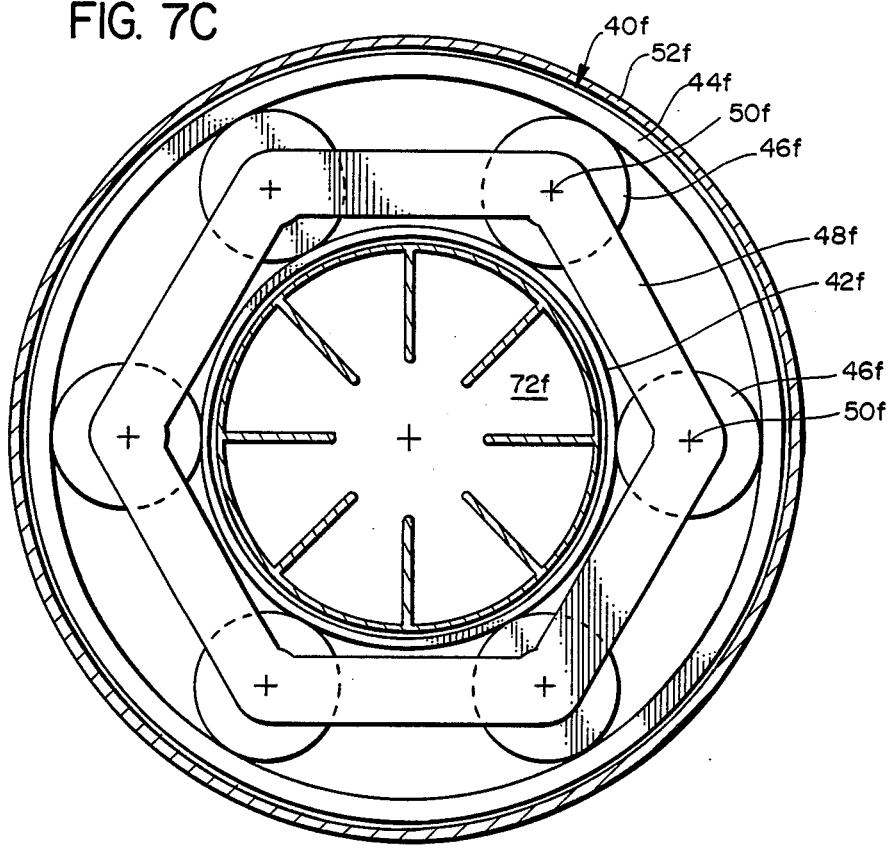
FIG. 7C is a sectional view taken along line 7C—7C of FIG. 7B.

A seventh embodiment of the present invention is shown in FIGS. 7A-7B, where the overall assembly 10f is of a pusher configuration, with the two propellers 18f and 20f being mounted rearwardly of the turbine section 28f. There is a planetary gear assembly 40f positioned rearwardly of the turbine sections 28f and radially outwardly of the passageway 72f. As in the prior embodiment, there is a sun gear 42f which is driven directly from a row of turbine blades 32f which is made into a torque frame. The ring gear 44f is connected to the forward propeller 18f, while the planet carrier 48f is directly connected to the rear propeller 20f.

The mode of operation is substantially the same as in the prior embodiments. It will be noted that with the sun gear 42f being located radially outwardly of the passageway 72f, the radius of the sun gear 42f is necessarily greater than some of the previous embodiments (i.e. the first two embodiments). Further, the sun gear 42f is connected directly to the turbine blades 32f, with no intermediate speed reduction. Accordingly, the embodiment of FIG. 7 would be better adapted to a smaller turboprop engine where the propeller speed may be greater, and the turbine section 28f may be made with a greater number of stages so that the turbine blades 32f would rotate at a somewhat slower rate.

It is to be understood that various modifications could be made to the embodiments described herein without departing from the basic teachings of the present invention.

We claim:
1. A turboprop propulsion assembly comprising:
 a. a nacelle having a support structure;
 b. a gas generating and power section mounted in said support structure and having a longitudinally extending operating axis, said gas generating and power section comprising:
  1. a compressor means to receive intake air;
  2. a burner means to receive air from the compressor and burn fuel therein to create a gaseous combustion product;
  3. a turbine means having a turbine blade means centered on, and rotatable about, said operating axis;
 c. said nacelle having a forward inlet and a rear exhaust nozzle, with said propulsion assembly defining a substantially continuous gaseous fluid flow path from said inlet through said gas generating and power section to said exhaust nozzle;
 d. first and second propellers mounted for counter-rotation at a mounting location radially outward of said flow path;
 e. a planetary drive transmission comprising:
  1. an inner sun gear means of a relatively smaller diameter, mounted for rotation about said operating axis and operatively connected to said turbine means so as to be driven thereby;
  2. a ring gear means of a relatively larger diameter, mounted for rotation relative to said support structure about said operating axis and drivingly connected to said first propeller for rotation in a first direction;
  3. a planetary means comprising planetary gear means rotatable about axis means generally parallel to said operating axis and drivingly interconnected between the sun gear means and the ring gear means in a manner that rotation of said sun gear means relative to said planetary means in a first direction causes rotation of said ring gear means relative to said planetary means in a second direction opposite to the first direc- tion, and further comprising planet carrier means operatively connected to the planetary gear means and rotatable about the operating axis, said planet carrier means being drivingly connected to the second propeller means for rotation in a direction opposite to the direction of rotation of the first propeller;

f. said planetary transmission being positioned at a location spaced radially from said flow path in a manner that gaseous fluid flow through said flow path can be optimized, g. a gear box enclosing said planetary drive transmission;

h. first torque frame means interconnected between said ring gear means and said first propeller, and second torque frame means interconnected between said planet carrier means and said second propeller, said first and second propellers being axially spaced from said first and second torque frame means, respectively;

i. at least two sets of bearing means positioned at axially spaced locations within said gear box to provide bearing support for said first and second torque frame means;

whereby as said turbine section rotatably drives said sun gear, said sun gear causes relative counter-rotation of said planet carrier and said ring gear to cause counter-rotation of said propellers.

2. The assembly as recited in claim 1, wherein said planetary drive transmission is positioned radially inwardly of said flow path, and said first and second torque frame means extend from said ring gear means and said planetary carrier means through said flow path to connect to said first and second propellers.

3. The assembly as recited in claim 2, wherein said flow path has a flow section positioned rearwardly of said turbine means, and said first and second torque frame means extend through said flow section.

4. The assembly as recited in claim 3, wherein said first and second torque frame means comprise strut means contoured to react to gaseous flow from said turbine means to create a power input to said propellers.

5. The assembly as recited in claim 3, wherein said propellers are mounted to a rear portion of said support structure in a pusher configuration.

6. The assembly as recited in claim 2, wherein said flow path has a flow section positioned forwardly of said compressor means and said first and second torque frame means are connected between said ring gear means and said planetary carrier means through said flow section to connect to said first and second propellers.

7. The assembly as recited in claim 6, wherein said first and second torque frame means comprise strut means contoured to react to gaseous flow into said compressor means to create a supercharging effect to the compressor means.

8. The assembly as recited in claim 6, wherein said propellers are mounted to a forward portion of said support structure in a tractor configuration.

9. The assembly as recited in claim 1, wherein said planetary drive transmission is located radially outwardly of said flow path, and there is connecting means extending through said flow path and operatively connecting said turbine means with said sun gear means.

10. The assembly as recited in claim 9, when there is a path section of said path positioned forwardly of said compressor means, and said connecting means extends through said path section.

11. The assembly as recited in claim 10, wherein said connecting means comprises strut means extending through said path section.

12. The assembly as recited in claim 10, wherein said propellers are mounted to a forward portion of said support structure in a tractor configuration.

13. The assembly as recited in claim 9, wherein there is a path section of said path positioned rearwardly of said turbine means, and said connecting means extends through said path section.

14. The assembly as recited in claim 13, wherein said connecting means comprises strut means contoured to engage gaseous exhaust from said turbine means to provide additional power to said propellers.

15. The assembly as recited in claim 13, wherein said propellers are mounted to a rear portion of said support structure in a pusher configuration.

16. The assembly as recited in claim 9, wherein there is a planetary drive assembly mounted radially inwardly of said flow path, and said planetary assembly is drivingly connected between said turbine means through said connecting means to the sun gear of the planetary drive transmission in a manner to cause speed reduction of said sun gear means relative to said turbine means.

17. The assembly as recited in claim 16, wherein said planetary assembly comprises a second sun gear means operatively connected to said turbine means, a second ring gear means connected through said connecting means to said sun gear means of the planetary transmission, and second planetary means having a planetary carrier mounted so as to be stationary relative to said nacelle support structure.

18. The assembly as recited in claim 16, wherein said planetary assembly is positioned forwardly of said compressor section, and there is a flow section of said flow path positioned forwardly of said compressor means, said connecting means extending through said flow path section.

19. The assembly as recited in claim 16, wherein said planetary assembly is positioned rearwardly of said turbine section, and there is a flow path section of said fluid flow path positioned rearwardly of said turbine means, said connecting means extending through said flow path section.

20. The assembly as recited in claim 9, wherein there is a planetary assembly positioned radially outwardly of said fluid flow path, said planetary assembly being drivingly connected between said planetary transmission and said turbine means.

21. The assembly as recited in claim 20, wherein said connecting means is operatively connected between said turbine means and a sun gear of said planetary assembly, said planetary assembly further comprising a second planetary means comprising a second planetary gear means and a second planetary carrier, said second planetary carrier being connected to the sun gear means of the planetary transmission.

22. The assembly as recited in claim 21, wherein said propellers are mounted at a forward portion of said nacelle support structure, and there is a flow path section of said fluid flow path located forwardly of said compressor means, said connecting means extending through said flow path section to connect to said planetary assembly.

23. The assembly as recited in claim 21, wherein said propellers are mounted to a rear portion of said nacelle support structure, and there is a flow path section of said fluid flow path positioned rearwardly of said turbine means, said connecting means extending through said flow path section to connect to said planetary assembly.

24. The assembly as recited in claim 20, wherein said propellers are mounted at a forward portion of said nacelle support structure, and there is a flow path section of said fluid flow path located forwardly of said compressor means, said connecting means extending through said flow path section to connect to said planetary assembly.

25. The assembly as recited in claim 20, wherein said propellers are mounted to a rear portion of said nacelle structure, and there is a flow path section of said fluid flow path positioned rearwardly of said turbine means, said connecting means extending through said flow path section to connect to said planetary assembly.

26. The assembly as recited in claim 1, wherein said propulsion assembly has a primary mount by which said gas generating and power system, said propellors and said drive transmission are mounted to said nacelle support structure, said primary mount being positioned immediately rearwardly of said turbine means and forwardly of said planetary drive transmission, with loads from said planetary drive transmission being transmitted to said primary mount.

27. The assembly as recited in claim 26, wherein said planetary drive transmission is positioned radially inwardly of said flow path, and said first and second torque frame means extend from said ring gear means and said planetary carrier through said flow path to connect to said first and second propellors, whereby said propellors can be desirably located relative to said planetary drive transmission to provide relatively short load paths to the drive transmission, with the drive transmission having a relatively short load path to said primary mount.

28. The assembly as recited in claim 1, wherein said propulsion assembly has a primary mount by which said gas generating and power system, said propellors and said drive transmission are mounted to said nacelle support structure, said primary mount being positioned immediately forwardly of said compressor means and rearwardly of said planetary drive transmission, with loads from said planetary drive transmission being transmitted to said primary mount.

29. The assembly as recited in claim 28, wherein said planetary drive transmission is positioned radially inwardly of said flow path, and there is first and second torque frame means which extend from said ring gear means and said planetary carrier through said flow path to connect to said first and second propellors, whereby said propellors can be desirably located relative to said planetary drive transmission to provide relatively short load paths to the drive transmission, with the drive transmission having a relatively short load path to said primary mount.

30. The assembly as recited in claim 1, wherein said turbine means comprises a first compressor turbine section having a drive connection to said compressor means, and a separate free turbine section powered independently of said turbine compressor section and operatively connected through said planetary drive transmission to said propellors.

31. The assembly as recited in claim 1, wherein said turbine means comprises at least one shared load turbine section having a drive connection through said planetary drive transmission to said propellors, and also having an operative drive connection to at least a portion of said compressor means.

* * * * *